United States Patent [19]

Ahvenainen et al.

[11] Patent Number: 5,391,654
[45] Date of Patent: Feb. 21, 1995

[54] METHOD FOR HOMO- OR COPOLYMERIZING ETHENE

[75] Inventors: Antero Ahvenainen; Kari Sarantila; Henrik Andtsjö, all of Porvoo, Finland

[73] Assignee: Neste OY, Finland

[21] Appl. No.: 66,004

[22] PCT Filed: Dec. 18, 1991

[86] PCT No.: PCT/FI91/00397

§ 371 Date: May 25, 1993

§ 102(e) Date: May 25, 1993

[87] PCT Pub. No.: WO92/12181

PCT Pub. Date: Jul. 23, 1992

[30] Foreign Application Priority Data

Dec. 28, 1990 [FI] Finland .................................. 906427

[51] Int. Cl.⁶ .................................................. C08F 2/06
[52] U.S. Cl. .......................................... 526/64; 526/905; 526/352
[58] Field of Search .......................................... 526/64

[56] References Cited

U.S. PATENT DOCUMENTS

| | | | |
|---|---|---|---|
| 3,242,150 | 3/1960 | Scoggin | 260/88.2 |
| 3,324,093 | 10/1963 | Alleman | 260/88.2 |
| 4,007,321 | 2/1977 | Scholz et al. | 526/64 |
| 4,582,816 | 4/1986 | Miro | 502/105 |
| 4,754,007 | 1/1988 | Pullukat et al. | 526/130 |

FOREIGN PATENT DOCUMENTS

| | | | |
|---|---|---|---|
| 0005215 | 4/1979 | European Pat. Off. | |
| 0057420 | 2/1982 | European Pat. Off. | 526/64 |
| 1520461 | 9/1971 | Germany | |

Primary Examiner—Joseph L. Schofer
Assistant Examiner—David Wu
Attorney, Agent, or Firm—Steinberg, Raskin & Davidson

[57] ABSTRACT

The invention relates to a method for homo- or copolymerizing ethene in the presence of a Ziegler-Natta or other catalyst and a possible comonomer and hydrogen for preparing a homo- or copolymer of ethene in particle form in propane. In accordance with the invention, the polymerization is performed in a loop reactor under such supercritical conditions where the temperature is higher than the critical temperature of the mixture formed by ethene, propane and a possible hydrogen and a comonomer, but lower than the melting temperature of the ethene polymer forming in the polymerization, and the pressure is higher than the critical pressure of said mixture.

8 Claims, No Drawings

METHOD FOR HOMO- OR COPOLYMERIZING ETHENE

The invention relates to a method for homo- or copolymerizing ethene in the form of solid polymer particles.

The polymerization of ethene in the form of solid particles in a liquid phase is known. In such processes, the polymerization is typically performed in a reaction medium or a diluent, which is formed by isobutane, pentane, hexane or some other saturated aliphatic hydrocarbon. The polymerization is often performed in the presence of a Ziegler-Natta catalyst at an elevated temperature. In addition to monomers, hydrogen is often used as a modifier in the polymerization, by means of which the molecular weight of the polymer to be prepared and its other properties may be affected.

Processes are also known, in which liquid propane is used as a reaction medium. For example the U.S. Pat. No. 4,754,007 describes a process for preparing an ethene copolymer in the form of particles by using liquid propane as a liquid phase. It is postulated that certain problems related to the usage of the abovementioned hydrocarbons may be avoided in this way. These disadvantages include for example that the usable temperature is limited, since polyethene dissolves in the reaction medium at high temperatures. Therefore, the separation of comonomers and the reaction medium from each other is difficult. Furthermore, the copolymers to be prepared have a relatively wide molecular-weight distribution.

In accordance with the U.S. Pat. No. 4,754,007, liquid propane is used as a reaction medium. In addition to the cheapness of propane, the advantages to be achieved in this way include that propane has a lower vaporization heat and it evaporates more easily that e.g. isobutane. The use of propane thus makes a more effective separation of the reaction medium from the polymer possible. Furthermore, the use of propane helps to keep the reactor clean when polymerizing ethene in the form of particles.

The U.S. patent especially emphasizes that the polymerization should be performed below the critical temperature of propane, which is 96.8° C. According to the patent, the process is performed in a batch reactor, in which a considerable gas volume prevails above the liquid phase. If a continuous loop reactor is preferred, the situation is completely different. The reactor has then to be completely filled with the liquid phase, since the gas bubbles in the reaction medium would cause cavitation and thereby wearing in the circulation pumps for the reaction medium. The situation worsens, if it is desirable to prepare in the loop reactor a product with a higher melt index by adding hydrogen to the reaction medium. When operating below the critical point, as is the case in the U.S. Pat. No. 4,754,007, separation of phases occurs as hydrogen is bubbling, and pressure shocks arise, which means that the process cannot be applied to a loop reactor.

It may be indicated that when the reaction mixture of a loop reactor contains 93 mol-% of propane and 7 mol-% of ethene, the critical point of the mixture is $T_c=92.9°$ C., $P_c=44.1$ bar. If the reaction medium contains 7 mol-% of ethene and 2 mol-% of hydrogen (the remainder being propane), the maximum operable temperature of the reactor is 75° C., which is far too low a temperature from the point of view of the polymerization. In the case of a mixture containing 7 mol-% of ethene and 2.5 mol-% of hydrogen (the remainder being propane), the maximum operable temperature is only 60° C. It is thus apparent that the process according to said US patent cannot be realized in a loop reactor. However, it has been observed in accordance with the invention that a loop reactor may be used, if the polymerization is performed above the critical point. More specifically, this relates to a critical point of a fluid mixture, which is formed by ethene acting as a monomer (+possible comonomers), propane and possibly hydrogen acting as a modifier. Ethene and hydrogen decrease said critical point to some extent and the critical point may be determined experimentally, when the concentrations of the components in the reaction medium are known.

The invention thus relates to a method for homo- or copolymerizing ethene in the presence of a Ziegler-Natta catalyst and a possible comonomer and hydrogen for preparing a homo- or copolymer of ethene present in a particle form in propane. The inventive method is characterized in that the polymerization is performed in a loop reactor conditions, wherein the temperature is higher than the critical temperature of a fluid mixture formed by ethene, propane and a possible hydrogen and a comonomer, but lower than the melting temperature of the ethene polymer forming in the polymerization, and the reaction pressure is higher than the critical pressure of the mixture.

When using a propane phase at a supercritical state, several advantages may be achieved:

1) The hydrogen content of the reactor may be adjusted within a wide range, since the operation occurs above the critical point. Then, separate liquid and gas phases can no longer be indicated, but a single phase is concerned. The separation of the phases cannot thus occur before the hydrogen concentration increases to a very high level. Because of this, more polymer types may be prepared in the reactor than when using e.g. isobutane or when using propane and operating below the critical point. Hydrogen may be added sufficiently, since the separation (bubbling) of the hydrogen or gases does not occur at the required hydrogen concentrations.

2) Since the reactor is operated in supercritical conditions, the compressibility of the reaction fluid is good and the start-up and the operation (pressure regulation) of the reactor are facilitated, since no pressure-shock effects occur. Changes in the fluid volume always occur in the discharge of the product, which results in bubbling. When operating in a supercritical state, no bubbling phenomenon occurs.

3) The solubility of polyethylene is lower in propane than in isobutane, whereby especially polymer particles having a high melt index, such as 50–500, do not dissolve in the medium and the reactor dirties less.

4) Since the boiling point of propane is low, the hydrocarbons may be separated from the polymer particles more effectively after the polymerization.

The inventive method is adaptable for homo- or copolymerizing ethene. Suitable comonomers include e.g. propene, 1-butene, 1-pentene, 1-hexene, 4-methyl-1-pentene, 1-octene, 1-decene, 1-dodecene and 1-octadecene.

The usage of hydrogen as a modifier is especially well adaptable to the inventive method, when catalysts of a Ziegler-Natta type are used and when polymers with a higher melt index are desired. For the above-mentioned reasons, a sufficient amount of hydrogen can always be added.

The polymerization is thus performed under conditions in which the temperature is higher than the critical point of the mixture formed by propane, ethene and a possible comonomer as well as hydrogen and lower than the melting point of the ethene polymer to be produced, and the pressure is higher than the critical pressure of the reaction mixture. The polymer to be formed is then in the form of separate particles, which have an essentially uniform size and shape.

The inventive polymerization is thus preferably performed at a temperature range of 90–110° C. Since the density of the fluid in a supercritical state is strongly dependent on the pressure in the vicinity of the critical point, the operating pressure has to be selected so high that the effect of the pressure on the density is smaller. A sufficient pressure range depends on the hydrogen concentration used, but a suitable pressure in the polymerization reactor is generally 60–80 bar. Hydrogen may be added to the reactor up to 4 mol-% without adversely affecting the operability of the reactor. The polymerization reaction is generally performed in propane, to which ethene acting as a monomer, possible comonomers, as well as hydrogen and a catalyst are added. The polymer is removed cyclically from the reactor, and the polymer is separated from propane and the monomers in a conventional manner. The polymer is preferably separated from the other substances by means of flash technique by reducing the pressure.

Any catalysts used conventionally in the polymerization of ethene may be used as polymerizing catalysts. Ziegler catalysts are especially suitable to be used in the inventive method. They are catalysts, which contain transition metal components from the metals of the groups IV, V and VI of the Periodic Table of Chemical Elements. Titanium-containing catalysts are especially suitable and the catalysts used in the inventive method may also contain a support, which may be e.g. silica, alumina and silica-alumina.

In addition to Ziegler catalysts, other catalyst types, such as chromium catalysts, may be preferably used in the inventive method. The selection of the catalyst essentially depends on the type of polyethene to be prepared.

The inventive method is not limited to only one loop reactor. It is possible and in some cases even preferable to use two loop reactors in series, whereby very high hydrogen concentrations may be used in both reactors or in either one of the two reactors and ethene polymers and/or copolymers having a wide or bimodal molecular-weight distribution may thus be prepared.

For illustrating the invention, a reference is further made to the following Examples 1–3, in which the polymerization was performed in pilot-scale loop reactor, in which the reactor diameter was 0.25 m and length 12 m. As a catalyst in the Example was used a Ziegler-Natta type catalyst on a silica carrier, in which catalyst the Ti content was 4.30% by weight, the Mg content 2.80% by weight and the Al content 1.20% by weight.

The running conditions of the loop reactor and the product properties are shown in the following Table 1.

TABLE 1

| Running conditions | Ex. 1 | Ex. 2 | Ex. 3 |
|---|---|---|---|
| Temperature (°C.) | 98° C. | 98° C. | 98° C. |
| Pressure (bar) | 65 bar | 65 bar | 65 bar |
| Catalyst feed rate (g/h) | 11 | 11 | 11 |
| Propane feed rate (kg/h) | 32 | 30 | 30 |
| Ethene feed rate (kg/h) | 21 | 22 | 25 |
| Ethene concentration (mol-%) | 6.5 | 6.4 | 6.4 |
| Hydrogen feed rate (g/h) | 43 | 47 | 57 |
| Hydrogen concentration (mol-%) | 1.44 | 1.48 | 1.67 |
| Polymer production rate (kg/h) | 20 | 20 | 20 |
| Product properties | | | |
| Density (kg/m$^3$) | 980.6 | 982.0 | 983.0 |
| Melt index MI2 (g/10 min) | 67.0 | 86.0 | 104.0 |
| Average particle size (mm) | 0.27 | 0.27 | 0.27 |
| Bulk density (kg/m$^3$) | 425 | 422 | 420 |

When the test runs according to the Examples were performed, it was observed that the reactor operability was excellent in spite of the fact that the hydrogen concentration was increased to raise the melt index.

We claim:

1. Method of polymerizing ethylene in particle form, which comprises polymerizing ethylene in a reaction mixture of ethylene, and ethylene polymerizing catalyst, optional hydrogen and optional comonomer in propane in a loop reactor under supercritical conditions of temperature and pressure, the temperature being higher than the critical temperature and the pressure being higher than the critical pressure of said reaction mixture to form a polyethylene polymer, said temperature being below the melting temperature of the thus formed polyethylene polymer, whereby said polymer is formed in particle form which can be easily separated from the remainder of the reaction mixture.

2. Method according to claim 1 wherein said temperature is 95°–110° C. and said pressure is 60–80 bar.

3. Method according to claim 1 wherein said reaction mixture includes hydrogen in an amount of up to 4 mol percent.

4. Method according to claim 2 wherein said reaction mixture includes hydrogen in an amount of up to 4 mol percent.

5. Method according to claim 1 wherein the polymerization is effected in a series of at least 2 loop reactors.

6. Method according to claim 2 wherein the polymerization is effected in a series of at least 2 loop reactors.

7. Method according to claim 1 wherein the reaction is effected to produce polyethylene having a melt index of 50–500.

8. Method according to claim 2 wherein the reaction is effected to produce polyethylene having a melt index of 50–500.

* * * * *